United States Patent [19]

Torimoto et al.

[11] Patent Number: 4,731,555
[45] Date of Patent: Mar. 15, 1988

[54] LEAD WIRE LAYOUT IN COIL UNITS FOR STEPPING MOTOR

[75] Inventors: Koichi Torimoto; Hiroaki Takada, both of Hyogo, Japan

[73] Assignee: Mitsubishi Denki Kabushiki Kaisha, Tokyo, Japan

[21] Appl. No.: 931,779

[22] Filed: Nov. 18, 1986

[30] Foreign Application Priority Data

Nov. 22, 1985 [JP] Japan .............................. 60-180020[U]

[51] Int. Cl.⁴ ............................................... H02K 3/32
[52] U.S. Cl. ...................................... 310/71; 310/194; 310/259; 336/192
[58] Field of Search ................... 310/43, 45, 52, 68 D, 310/71, 89, 194, 208, 254, 263, 259

[56] References Cited

U.S. PATENT DOCUMENTS

| | | | |
|---|---|---|---|
| 2,548,206 | 4/1951 | Drom | 336/192 |
| 3,195,088 | 7/1967 | Sandoz | 336/192 |
| 3,843,946 | 10/1974 | Anderson et al. | 336/192 |
| 4,363,014 | 12/1982 | Leach et al. | 336/192 |
| 4,553,056 | 11/1985 | Pfister | 310/43 |

Primary Examiner—Patrick R. Salce
Assistant Examiner—D. L. Rebsch
Attorney, Agent, or Firm—Sughrue, Mion, Zinn, Macpeak, and Seas

[57] ABSTRACT

A pair of annular coil units for a stepping motor in which each of the coil units has three coil terminals and the ends of the lead wires connected thereto encapsulated by a synthetic resin thereby forming outwardly extending projections. Recesses are found between the projections so that the lead wires of one of the coil units can be laid out in the recesses between the terminals of the other coil unit.

4 Claims, 6 Drawing Figures

LEAD WIRE LAYOUT IN COIL UNITS FOR STEPPING MOTOR

BACKGROUND OF THE INVENTION

1. Field of the Invention

The present invention relates to a stator coil for a stepping motor, and particularly to the construction of the lead wire layout of the stator coil.

2. Background of the Invention

A conventional stepping motor includes two stator sections provided around a permanent magnet rotor. Each of the stator sections includes an annular coil and at least two yokes for generating alternate magnetic poles inside the annular coil. The coil is wound on a bobbin. Three lead wires are connected to the ends and to an intermediate tap of the coil through terminals. The coil and the connections of the coil and the lead wires are molded together with synthetic resin for the purpose of fixedly holding the connections, water-proofing the coil and the connections, and so forth. At the time of the molding as shown in FIG. 6, the three lead wires A, B and C are juxtaposed around the coil along its circumference and are then embedded together in a single holding projection D by the molding. The coil is thereafter combined with the yokes to constitute the stator section. Both stator sections are juxtaposed in the axial direction of the stepping motor. The lead wires for each coil are then led out in a single axial direction.

In the conventional stepping motor, the terminals are often displaced and short-circuited to each other due to the pressure of the molding, so that the yield for the production of the stepping motor is low.

In order to reduce such short circuit problems, sufficient distance between the terminals must be maintained. To increase the distance, the circumferential length of the holding projection D must be increased. In order to lay the lead wires for each coil out in the single axial direction, since both the coils are juxtaposed in the axial direction of the stepping motor, the holding projections D for both the coils need to be disposed in positions different from each other in the circumferential direction of the stepping motor, as shown in FIG. 6. A space extending in the axial direction of the stepping motor and having a circumferential length equal to the sum of the circumferential lengths of both the holding projections needs to be provided in a motor housing in which the coils are housed. For that reason, the size of the stepping motor must be quite large. The conventional stepping motor has such a problem of large size.

SUMMARY OF THE INVENTION

It is an object of the present invention to reliably prevent the short-circuiting of lead wires for coils, and to reduce a lead wire layout space in a motor housing to make a stepping motor compact.

In each of two coil units of the stepping motor provided according to the present invention, separate holding projections hold the respective lead wires. The projections are integrally joined with the coil unit by molding the coil and forming the projections with synthetic resin. Recesses are defined between the holding projections. The lead wires for one of the coil units are fitted in the recesses of the other coil unit so that the lead wires of the two coil units are alternately laid out.

At the holding projections for holding the lead wires apart from each other in the recesses between the projections, a molding die corresponding to the recesses serves to keep the terminals for the lead wires from moving into contact with each other at the time of the molding of the coil with the synthetic resin, to surely prevent the lead wires from being short-circuited to each other and to prevent shorts between the layers of the coil. Since the lead wires for one coil unit are fitted in the recesses between the lead wires of the other coil unit, the space provided in the housing in order to lay the lead wires therethrough is reduced to make the stepping motor compact. Since the lead wires are laid out through the recesses between the holding projections when the coils are placed adjacent each other, the size of the housing is reduced.

BRIEF DESCRIPTION OF THE DRAWINGS

FIG. 2 shows a front view of the coil unit not yet molded with synthetic resin.

FIG. 3 shows a sectional view of the coil unit.

FIG. 4 shows a front view of the coil unit.

FIG. 5 shows a front view of such coil units placed on each other.

DETAILED DESCRIPTION OF EXEMPLARY EMBODIMENT

Figure 1:
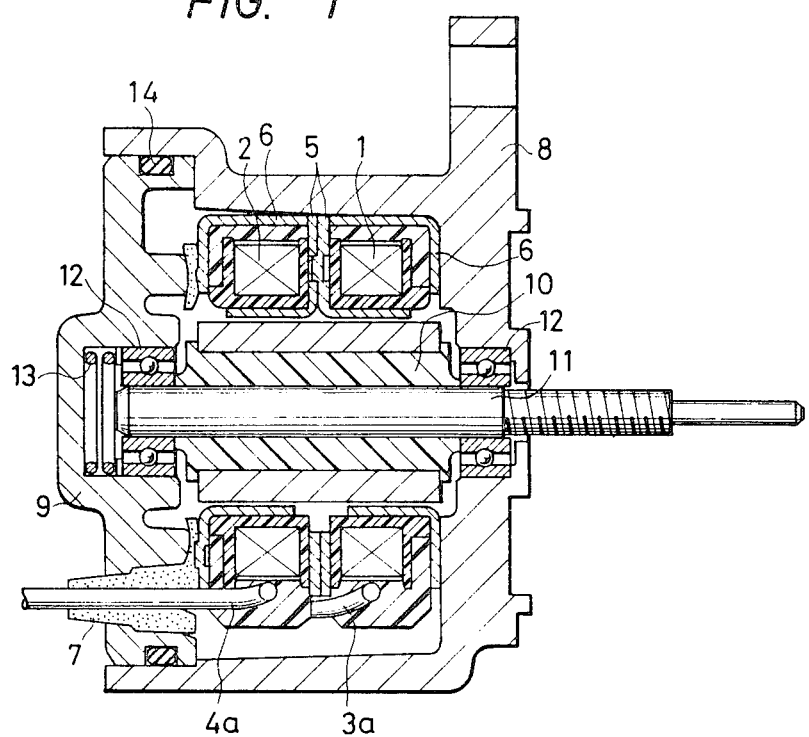
FIG. 1 shows a sectional view of a vehicle-mounted stepping motor provided according to the present invention.
Figure 2:
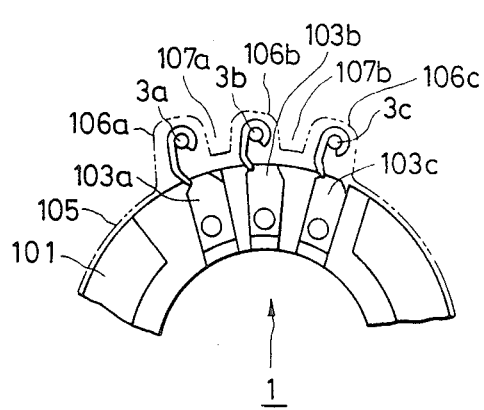
FIGS. 2, 3, 4 and 5 show an embodiment of the present invention, which is a coil unit.
Figure 3:
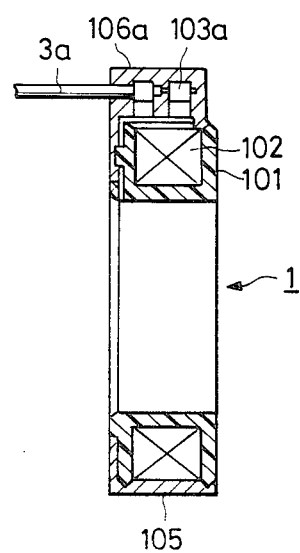

An embodiment of the present invention, which is a set of coil units for a stepping motor for a vehicle, is hereafter described with reference to the drawings. FIG. 1 shows a sectional view of the stepping motor as a whole. The stator of the stepping motor is constituted by a coil unit 1, in which, as shown in FIG. 3, a coil 102 made of an electromagnet wire is wound on a plastic bobbin 101. As further shown in FIG. 2, terminals 103a, 103b and 103c are then secured to a terminal holder at the flange of the bobbin 101. Both the ends and intermediate tap of the coil and corresponding lead wires 3a, 3b and 3c are then connected to opposite ends of the terminals 103a, 103b and 103c and these members are thereafter molded or encapsulated to form a synthetic resin holder 105 (FIG. 4), integral with the synthetic resin embedding the coil wires on the bobbin. Another coil unit 2, which has the same construction as the coil unit 1 is fixedly pinched together with the coil 1, yokes 5 and 6 and a grommet 7 between a housing 8 and a cover 9 that surround the coil units 1 and 2. A rotor 10 made of a permanent magnet having north and south poles alternating at equal intervals along the circumference of the rotor 10 is provided inside the stator. The rotor 10 and a motor shaft 11 are molded together with synthetic resin. Bearings 12 support the motor shaft 11 at two points. Pressure is applied to the bearings 12 by a compression spring 13. The housing 8 and the cover 9 are hermetically sealed to each other by an O-ring 14.

Figure 4:
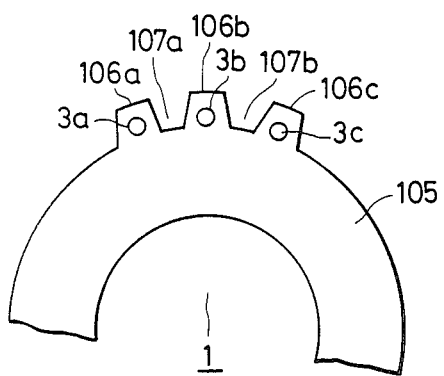

In the coil unit 1 (since the coil units 1 and 2 have the same construction, the coil unit 2 is not described in detail herein), the portions of the terminals 103a, 103b and 103c, which are connected to the lead wires 3a, 3b and 3c, are juxtaposed at prescribed intervals along the circumference of the coil 102. In that state, these portions of the terminals 103a, 103b and 103c are molded with the synthetic resin so as to make three holding projections 106a, 106b and 106c on the resin holder 105 for holding the lead wires 3a, 3b and 3c which stand apart from each other. Recesses 107a and 107b are defined between the holding projections 106a, 106b and 106c, as shown in FIGS. 2 and 4. Since the holding projections 106a, 106b and 106c are made at the same time as the molding of the coil with the synthetic resin, a die for making the recesses 107a and 107b at the time of the molding serves to surely prevent the terminals 103c, 103b and 103c from being displaced and short-circuited to each other in the holding projections.

Figure 5:
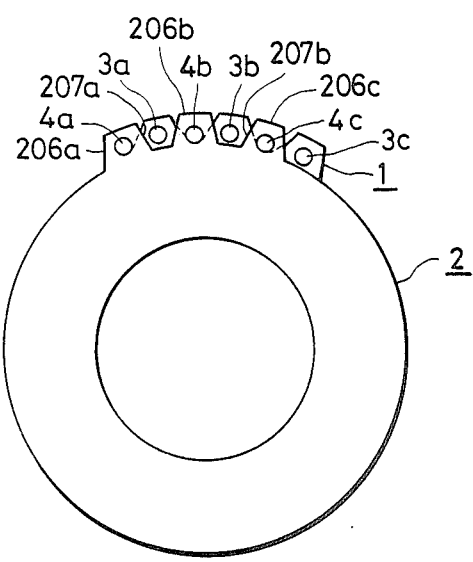
Figure 6:
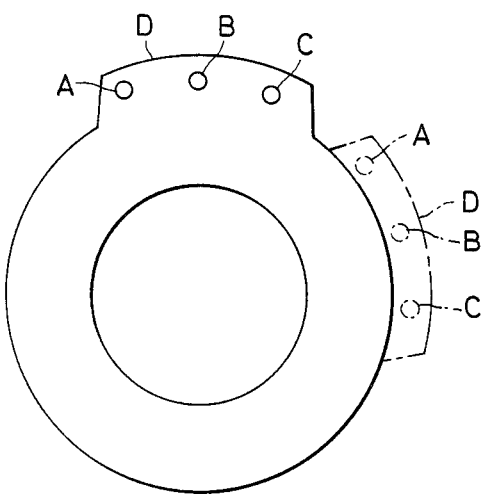
FIG. 6 shows a front view of conventional coil units.

FIG. 5 shows that the coil units 1 and 2 are placed on the same axial line. The lead wires 3a, 3b, 3c, 4c, 4b and 4c for the coil units 1 and 2 are laid out, perpendicularly upwards to the surface of the drawing. The lead wires 3a and 3b for the coil unit 1 are laid out through recesses 207a and 207b between holding projections 206a, 206b and 206c which hold the lead wires 4a, 4b and 4c of the other coil unit 2 apart from each other. For that reason, lead wire layout spaces provided in the cover 9 and the housing 8, in which the coil units 1 and 2 are housed, can be made small.

If the coil is made of a self-bonding electric wire, the coil is fused by the heat of the molding of the coil with the synthetic resin so that the coil is not deformed or the terminals do not float up at the time of the molding. The terminals can thus be prevented from jutting out of the holding projections, so as to increase the reliability. The same effect as the use of self-bonding electric wire can be produced if varnish is impregnated into the coil and set before the molding is performed.

What is claimed is:

1. A motor comprising:
   a rotor including a permanent magnet;
   at least two stator sections comprising first and second annular coil units and yokes juxtaposed along an axial direction of and located around said rotor; and
   at least two lead wires for each of said stator sections extending along said axial direction radially exterior to a respective one of said annular coil units wherein said one of said annual coil units comprises;
   a bobbin;
   a coil wound on said bobbin;
   at least two terminals, each connected at one end to said coil and at another end to a respective one of said lead wires; and
   a synthetic resin member encapsulating said coil, said terminals and the ends of the lead wires connected thereto and forming at least two projections extending radially outwardly from said coil and having a circumferential recess between said projections; and
   wherein at least one of said lead wires from the other coil unit is disposed in an axial direction within said recess of said one coil unit.

2. A motor as set forth in claim 1, wherein each said coil unit includes three radially extending terminals having three respective lead wires connected thereto and encapsulated by said resin member with two circumferential recesses therebetween.

3. A motor as set forth in claim 1, wherein each coil comprises a wound, self-bonding electric wire.

4. A motor as set forth in claim 1, further comprising a varnish impregnated in each coil whereby said synthetic resin member encapsulates said varnish impregnated coil and said lead wires.

* * * * *